United States Patent
Yahata

(10) Patent No.: US 8,511,656 B2
(45) Date of Patent: Aug. 20, 2013

(54) MEMBER MOUNT AND ASSEMBLY STRUCTURE THEREOF

(75) Inventor: Yuki Yahata, Komaki (JP)

(73) Assignee: Tokai Rubber Industries, Ltd., Aichi-Ken (JP)

(*) Notice: Subject to any disclaimer, the term of this patent is extended or adjusted under 35 U.S.C. 154(b) by 38 days.

(21) Appl. No.: 13/279,485

(22) Filed: Oct. 24, 2011

(65) Prior Publication Data
US 2012/0098178 A1 Apr. 26, 2012

(30) Foreign Application Priority Data

Oct. 26, 2010 (JP) .................................. 2010-239493
Oct. 19, 2011 (JP) .................................. 2011-230194

(51) Int. Cl.
*F16F 7/00* (2006.01)
*B60G 7/00* (2006.01)

(52) U.S. Cl.
USPC ........................................ 267/141.4; 248/635

(58) Field of Classification Search
USPC ............... 267/140.4, 141.1–141.7, 293, 294; 248/635; 296/35.1, 190.07
See application file for complete search history.

(56) References Cited

U.S. PATENT DOCUMENTS

| | | | |
|---|---|---|---|
| 6,416,030 B1 * | 7/2002 | Bergdahl et al. | 248/635 |
| 7,163,200 B2 * | 1/2007 | Dickson et al. | 267/141.4 |
| 7,261,365 B2 * | 8/2007 | Dickson et al. | 296/190.07 |

FOREIGN PATENT DOCUMENTS

| | | |
|---|---|---|
| JP | 3-118334 | 12/1991 |
| JP | 7-4457 | 1/1995 |
| JP | 2007-263148 | 10/2007 |

* cited by examiner

*Primary Examiner* — Christopher Schwartz
(74) *Attorney, Agent, or Firm* — Greenblum & Berstein, P.L.C.

(57) ABSTRACT

A member mount has an inner tubular member, an outer tubular member, and a rubber elastic body connecting the tubular members. An inner peripheral resin layer having an inner hole as a positional hole is layered on an internal peripheral surface of the inner tubular member and an outer peripheral resin layer is layered on an outer peripheral surface thereof. The resin layers are connected to each other in resin connection portions in connection holes passing through the inner tubular member in four positions in the circumferential direction at equal distances.

5 Claims, 9 Drawing Sheets

MEMBER MOUNT AND ASSEMBLY STRUCTURE THEREOF

CROSS-REFERENCE TO RELATED APPLICATIONS

The present application claims priority under 35 U.S.C. §119 of Japanese Applications No. 2010-239493, filed on Oct. 26, 2010, and No. 2011-230194, filed on Oct. 19, 2011, which are herein expressly incorporated by reference in their entireties.

BACKGROUND OF THE INVENTION

1. Field of the Invention

The present invention relates to a member mount elastically connecting a suspension member and a vehicle body of an automobile and isolating vibration therebetween, and an assembly structure of the member mount.

2. Description of Related Art

A suspension member, such as a sub-frame, is a skeletal frame member of a part of a vehicle to mount a suspension. The suspension is assembled to a vehicle body through the suspension member. In general, the suspension member and the vehicle body are elastically connected by a member mount. The member mount maintains a proper relative positional relationship between the suspension member and the vehicle body, isolates vibration of a suspension system transmitted to the vehicle body through the suspension member, and conversely, transmits a driving force and a braking force to the vehicle body. In case of a sub-frame, an engine and a transmission are mounted in addition to the suspension. In this case, the member mount, which elastically connects the sub-frame and the vehicle body, also isolates vibration from the engine.

As disclosed in Related Art 1, a member mount of this type generally has a rigid inner tubular member, a rigid outer tubular member surrounding the inner tubular member in a position radially away therefrom, and a rubber elastic body radially connecting the inner tubular member and the outer tubular member. The outer tubular member is fixed to a suspension member and the inner tubular member is fixed to a vehicle body, and thereby the suspension member and the vehicle body are elastically connected and vibration is isolated.

FIG. 7 is an example of a conventionally known member mount. The drawing illustrates a vehicle body member 200, a sub-frame (octothorpe (hash-character)-shaped sub-frame) 202 as a suspension member, a member mount 204, and an upper stopper 206. The member mount 204 has a rigid inner tubular member 208 composed of a tubular-shaped metal, a rigid outer tubular member 210 composed of a tubular-shaped metal and surrounding the inner tubular member 208 in a position radially away therefrom, and a tubular rubber elastic body 212 integrally vulcanized and attached in a state of radially connecting the inner tubular member 208 and the outer tubular member 210.

The member mount 204 is press-fitted and fixed to the sub-frame 202 in the outer tubular member 210 and is fixed to the vehicle body member 200 through a fastening bolt 218 in the inner tubular member 208. Specifically, an inner hole 214 is provided inside the inner tubular member 208. A positioning nut 216 is inserted from the vehicle body member 200 into the inner hole 214 in a downward direction in the drawing, the positioning nut 216 having a tubular portion and serving as a positioning member. The fastening bolt 218, which is inserted into the inner tubular member 208 from below in an upward direction in the drawing, is screwed into a female thread hole 220 in a central portion of the positioning nut 216. Thereby, the inner tubular member 208 is fastened and fixed to the vehicle body member 200 with the fastening bolt 218 and the positioning nut 216.

A projection 222 projecting externally in the radial direction along the entire periphery is provided on an outer peripheral surface of the inner tubular member 208. The inner tubular member 208 partially has a thick portion 224 projecting externally in the axial direction in the portion of the projection 222. The projection 222 is provided to harden a spring in a direction perpendicular to the axis of the rubber elastic body 212 and to enhance running stability of a vehicle. The entirety of the projection 222 is internally embedded in the rubber elastic body 212.

The positioning nut 216 positions the member mount 204, specifically its inner tubular member 208, relative to the vehicle body member 200. The positioning nut 216 has a tubular portion 217 having a circular external periphery and is fixed to the vehicle body member 200 by welding in advance.

A forged article is conventionally used as the inner tubular member 208 of the member mount 204. The internal peripheral surface of the inner tubular member 208, specifically the inner hole 214, and the outer peripheral surface are shaped concurrently at the time of forging the inner tubular member 208.

With the member mount 204, however, the metal inner tubular member 208 formed of a forged article is inevitably heavy. Furthermore, the processing cost is high due to individual forging and forming of the inner tubular member 208, increasing the cost of the member mount 204. Improvements are thus desired.

In order to connect the sub-frame 202 to the vehicle body member 200 through the member mount 204, the member mount 204 is fixed to the sub-frame 202 in advance. In this state, the member mount 204, specifically the inner tubular member 208, is fixed to the vehicle body member 200, and thereby the sub-frame 202 and the vehicle body member 200 are connected. At this time, the sub-frame 202 should be connected so as to have a predetermined proper relative positional relationship with the vehicle body member 200.

In the case where inner holes 214 of all inner tubular members 208 of four member mounts 204 disposed at four corner portions of the sub-frame 202, as shown in FIG. 8, have the same inner diameters to be fitted to four corresponding positioning nuts 216 in the vehicle body member 200 with no gap around the entire periphery, the member mounts 204 cannot practically be assembled to the vehicle body member 200 such that the positioning nuts 216 are inserted into the inner tubular members 208 in a state where the four member mounts 204 are mounted on the sub-frame 202 in advance. This is because a positional error generally occurs between the axis center of each of the four positioning nuts 216 and the axis center of each of the inner tubular members 208 of the four corresponding member mounts 204.

Conventionally, in any of the four member mounts 204, for example, the member mount 204 at a position $P_1$ in FIG. 8, the inner hole of the inner tubular member 208 is provided as a circular inner hole 214A, which is properly fitted to the positioning nut 216 along the entire periphery and is defined as a reference hole. In the member mount 204 at a position $P_2$ different from the position $P_1$, the inner hole of the inner tubular member 208 is provided as an inner hole 214B, which is an elongated hole having a short diameter properly fitted to the positioning nut 216 and a long diameter greater than the short diameter and having a looseness relative to the positioning nut 216 and is defined as a sub-reference hole. In the member mounts 204 in positions $P_3$ and $P_4$ different from the positions $P_1$ and $P_2$, the inner holes of the inner tubular members 208 are provided as inner holes 214C, each having a large diameter having a looseness along the entire periphery relative to the positioning nut 216. The positioning nut 216 is fitted to the circular hole 214A as the reference hole, and thereby the sub-frame 202 is positioned at the position $P_1$ in two orthogonal directions in the direction perpendicular to the axis of the vehicle body member 200. The positioning nut 216 is fitted to the short diameter of the elongated inner hole 214B, and thereby the sub-frame 202 is positioned in one direction perpendicular to the axis (left-right direction in FIG. 8). At this time, a looseness occurs between the positioning nut 216 and the inner hole 214B in the other direction perpendicular to the axis of the elongated inner hole 214B (vertical direction in FIG. 8), thus absorbing a displacement of the each of the axis centers of the positioning nut 216 and the inner hole 214B.

The member mounts 204 at the other positions $P_3$ and $P_4$ each have the inner hole 214C having a larger diameter than the positioning nut 216 and having a looseness along the entire periphery relative to the positioning nut 216. The looseness absorbs a positional error in the two orthogonal directions in the direction perpendicular to the axis in each of the inner holes 214C of the positions $P_3$ and $P_4$. Thereby, the sub-frame 202 can be assembled to the vehicle body member 200 in a proper relative positional relationship. The member mounts 204 at the positions $P_1$ and $P_2$ in FIG. 8 are same in the configuration other than the shape of the inner hole. The member mounts 204 at the positions $P_3$ and $P_4$ are different in the configuration and properties from the member mounts 204 at the positions $P_1$ and $P_2$.

In this case, however, the inner tubular members 208 should have the inner holes 214 different in the shape, though the member mounts 204 at the positions $P_1$ and $P_2$ are same. In other words, separate forged articles should be prepared for the inner tubular members 208. Preparing the inner tubular members 208 formed of two types of forged articles requires separate production (forging) processes, thus leading to an increase in the cost required for the inner tubular members 208.

A proposal of the inventor of the present invention is that a tubular metal pipe material having an inner diameter greater than the outer diameter of the positioning nut 216 is used as the inner tubular member 208. An inner peripheral resin layer having a tubular shape is layered on an inner peripheral surface thereof, and an outer peripheral resin layer having a tubular shape is provided on an outer peripheral surface thereof. The resin layers are connected in a resin connection portion in a connection hole passing through the internal tubular member 208. The inner hole 214 is thus provided by the inner peripheral resin layer, into which a positioning member, such as the positioning nut 216, is inserted.

An example of such a configuration is shown in FIGS. 9A and 9B. The drawing illustrates an inner tubular member 208 composed of a metal pipe material, an inner peripheral resin layer 226 layered on an inner peripheral surface thereof, an outer peripheral resin layer 228 layered on an outer peripheral surface of the inner tubular member 208, a connection hole 230 provided in the inner tubular member 208, and a resin connection portion 232 in the connection hole 230. The inner peripheral resin layer 226 and the outer peripheral resin layer 228 are connected to each other inside and outside in the resin connection portion 232.

The inner peripheral resin layer 226 and the outer peripheral resin layer 228 are not adhered to the inner tubular member 208 composed of a metal pipe material. The inner peripheral resin layer 226 and the outer peripheral resin layer 228 are held to the inner tubular member 208 through connection in the resin connection portion 232. Two connection holes 230 and resin connection portions 232 are provided in positions 180° away in the circumferential direction and opposite to each other in the direction perpendicular to the axis.

In this configuration in which the inner peripheral resin layer 226 is layered on the inner peripheral surface of the rigid metal inner tubular member 208 and the inner hole 214 is provided by the inner peripheral resin layer 226, the inner hole 214A at the position $P_1$ as the reference hole and the inner hole 214B at the position $P_2$ as the sub-reference hole in FIG. 8 can be readily provided inside the respective inner tubular members 208 by changing the shape of the inner peripheral resin layer 226 using the same rigid metal inner tubular member 208.

In test production of a composite member of the metal inner tubular member 208, the inner peripheral resin layer 226, and the outer peripheral resin layer 228, the composite member having the circular inner hole 214, however, it turns out that the inner peripheral resin layer 226 peels off from the inner peripheral surface of the inner tubular member 208 and that the shape turns to be an ellipse, as shown in FIG. 9B.

The ellipse phenomenon occurs because, as shown in FIG. 9B, the inner peripheral resin layer 226 shrinks due to cooling after molding; the portion other than the portion bound by the resin connection portion 232 peels off from the inner peripheral surface of the inner tubular member 208, thus deforming in the reduced-diameter direction; and accordingly, the entire shape of the inner peripheral resin layer 226 changes to an ellipse.

The ellipse-shaped inner peripheral resin layer 226, specifically the ellipse-shaped inner hole 214, prevents the positioning nut 216 as a positioning member from being inserted through the inner hole 214. Thus, the member mount 204, specifically the sub-frame 202, cannot be assembled to the vehicle body member 200. In FIG. 9B, the long hole diameter after the shape changes to an ellipse is represented by "a," and the short hole diameter by "b."

The example above is a case where the circular inner hole 214 is provided in the inner peripheral resin layer 226. A similar circumstance also arises in a case where the elongated inner hole 214 is provided in the inner peripheral resin layer 226. Specifically, deformation of the inner peripheral resin layer 226 in the reduced-diameter direction in the short diameter prevents the positioning nut 216 from being inserted therethrough. Deformation in the reduced-diameter direction in the long diameter reduces a looseness relative to the positioning nut 216, thus preventing the original purpose from being attained.

As related art of the present invention, Related Art 2 discloses a member mount in which an inner peripheral resin layer is provided on an inner peripheral surface of a metal inner tubular member; an outer peripheral resin layer is provided on an outer peripheral surface thereof; and a resin connection portion connects the resin layers through the inner tubular member. The disclosure of Related Art 2, however, is intended to pre-compress a rubber elastic member from the inner periphery and does not recite the purpose and method of resolution of the present invention, thus being different from the present invention.

[Related Art 1] Japanese Patent Laid-open Publication No. H7-4457

[Related Art 2] Japanese Patent Laid-open Publication No. 2007-263148

SUMMARY OF THE INVENTION

In view of the circumstances above, the present invention provides a member mount lighter and more affordable than a conventional member mount, having an inner peripheral resin layer on an inner peripheral surface of an inner tubular member for positioning, and effectively preventing deformation of the inner peripheral resin layer after molding. The present invention also provides an assembly structure of such a member mount.

A first aspect of the present invention provides a member mount elastically connecting a vehicle body and a suspension member and isolating vibration, the member mount including a rigid inner tubular member; a rigid outer tubular member surrounding the inner tubular member in a position radially away therefrom; and a rubber elastic body radially connecting the inner tubular member and the outer tubular member, the outer tubular member being fixed to a suspension member, the inner tubular member being fixed to a vehicle body in a positioned state to the vehicle body by inserting therein a positioning member projecting from the vehicle body. A tubular inner peripheral resin layer is layered on an inner peripheral surface of the inner tubular member, the inner peripheral resin layer allowing the positioning member to be inserted into an inner hole provided inside for positioning the inner tubular member. A tubular outer peripheral resin layer is layered on an outer peripheral surface of the inner tubular member, the outer peripheral resin layer projecting radially outward from the outer peripheral surface and increasing spring hardness in a direction perpendicular to an axis of the rubber elastic body. The inner peripheral resin layer and the outer peripheral resin layer are connected to each other in resin connection portions in connection holes passing through the inner tubular member in a plurality of positions of four or more in a circumferential direction at equal distances.

A second aspect of the present invention provides the member mount according to the first aspect, in which the positioning member has a circular outer peripheral shape and the inner peripheral resin layer has a circular inner hole having a hole diameter that corresponds to an outer diameter of the positioning member and fitted to the positioning member along an entire periphery.

A third aspect of the present invention provides the member mount according to the first aspect, in which the positioning member has a circular outer peripheral shape and the inner peripheral resin layer has an elongated inner hole having a short diameter that corresponds to an outer diameter of the positioning member and a long diameter greater than the outer diameter.

A fourth aspect of the present invention provides the member mount according to one of the first to third aspects, in which the connection holes and resin connection portions are each provided in an axially central portion of the inner tubular member having an axially straight shape.

A fifth aspect of the present invention provides the member mount according to one of the first to fourth aspects, in which the outer peripheral resin layer is provided closer to one end in the axial direction of the inner tubular member having an axially straight shape.

A sixth aspect of the present invention provides an assembly structure of member mounts to a vehicle body in two different positions in a state of maintaining a relative positional relationship to each other, each of the member mounts elastically connecting the vehicle body and a suspension member and isolating vibration, each of the member mounts including a rigid inner tubular member, a rigid outer tubular member surrounding the inner tubular member in a position radially away therefrom, and a rubber elastic body radially connecting the inner tubular member and the outer tubular member, the outer tubular member being fixed to a suspension member, the inner tubular member being fixed to the vehicle body in a positioned state to the vehicle body by inserting therein a positioning member projecting from the vehicle body, the structure including an inner hole inside the inner tubular member of a first member mount provided as a circular reference hole having a hole diameter that corresponds to an outer diameter of a positioning member so as to be fitted thereto along an entire periphery, the positioning member having a circular outer peripheral shape and projecting from the vehicle body; and an inner hole inside the inner tubular member of a second member mount provided as an elongated sub-reference hole having a short diameter that corresponds to an outer diameter of the positioning member and a long diameter greater than the outer diameter, the reference hole being fitted to the positioning member along the entire periphery so as to position the first member mount in two orthogonal directions in a direction perpendicular to an axis, the sub- reference hole being fitted to the positioning member in the short diameter so as to position the second member mount in one direction perpendicular to the axis and in an orthogonal direction to an alignment direction of the first member mount, the sub-reference hole absorbing in the long diameter direction a positional error relative to the positioning member. In each of the member mount, a tubular inner peripheral resin layer is layered on an inner peripheral surface of the inner tubular member, the inner peripheral resin layer allowing the positioning member to be inserted into the inner hole provided inside for positioning the inner tubular member; a tubular outer peripheral resin layer is layered on an outer peripheral surface of the inner tubular member, the outer peripheral resin layer projecting radially outward from the outer peripheral surface and increasing spring hardness in the direction perpendicular to the axis of the rubber elastic body; and the inner peripheral resin layer and the outer peripheral resin layer are connected to each other in the resin connection portions in connection holes passing through the inner tubular member in a plurality of positions of four or more in a circumferential direction at equal distances. In the first member mount, the inner tubular member has a tubular shape having an inner diameter greater than the outer diameter of the positioning member, and the inner peripheral resin layer is layered on the inner peripheral surface of the inner tubular member, the inner peripheral resin layer having a circular inner hole that has a hole diameter corresponding to the outer diameter of the positioning member and that is fitted to the positioning member along the entire periphery, the inner hole being provided as the reference hole. In the second member mount, the inner tubular member has a tubular shape having same dimensions as the inner tubular member of the first member mount, and the inner peripheral resin layer is layered on the inner peripheral surface of the inner tubular member, the inner peripheral resin layer having an elongated inner hole having a short diameter that corresponds to an outer diameter of the positioning member and a long diameter greater than the outer diameter, the inner hole being provided as the sub-reference hole.

As described above, the tubular inner peripheral resin layer is layered on the inner peripheral surface of the inner tubular member in the member mount, the inner peripheral resin layer allowing the positioning member that projects from the vehicle body to be inserted into the inner hole provided inside for positioning the inner tubular member. The tubular outer peripheral resin layer is layered on the outer peripheral surface of the inner tubular member, the outer peripheral resin layer increasing the spring hardness in the direction perpendicular to the axis of the rubber elastic body. The inner peripheral resin layer and the outer peripheral resin layer are connected to each other in the resin connection portions in the connection holes passing through the inner tubular member in a plurality of positions of four or more in the circumferential direction at equal distances.

According to the present invention, the inner peripheral resin layer layered on the inner peripheral surface desirably positions the positioning member projecting from the vehicle body while a metal pipe material is used which is thinner and less expensive than a conventional forged article. Merely changing the shape of the inner peripheral resin layer changes the shape of the inner hole into which the positioning member is inserted even with use of the same metal pipe material for the inner tubular member, thus further reducing the cost of the inner tubular member.

In the present invention, the inner peripheral resin layer and the outer peripheral resin layer are connected to each other in the resin connection portions in the connection holes passing through the inner tubular member in a plurality of positions of four or more in the circumferential direction at equal distances. Thus, the peripheral length can be shortened from one resin connection portion to the adjacent resin connection portion in the inner peripheral resin layer, and all peripheral lengths between adjacent resin connection portions can be equal. Accordingly, deformation can be effectively prevented from occurring in association with peeling off from the inner peripheral surface of the inner tubular member due to shrinkage caused by cooling after molding of the inner peripheral resin layer, and the shape of the inner hole can be prevented from deforming due to the deformation of the inner peripheral resin layer. It is desirable that the connection holes and the resin connection portions be provided in positions of an even number. Thereby, the connection holes can be processed easily and the processing cost can be low.

In the present invention, the inner peripheral resin layer may have the circular (true circular) inner hole having the hole diameter that corresponds to the outer diameter of the positioning member and fitted to the positioning member along an entire periphery, in accordance with the circular outer peripheral shape of the positioning member (second aspect). The hole diameter that corresponds to the outer diameter of the positioning member herein refers to a hole diameter having a minute gap of 0.25 mm or less on one side relative to the outer peripheral surface of the positioning member as a design median.

Furthermore, the inner peripheral resin layer may have the elongated inner hole having the short diameter that corresponds to the outer diameter of the positioning member and the long diameter greater than the outer diameter of the positioning member in the present invention (third aspect).

In addition, it is preferable in the present invention that the connection holes and the resin connection portions be each provided in the axially central portion of the inner tubular member having an axially straight shape (fourth aspect). With the connection holes and the resin connection portions positioned closer to one end from the axially central portion, the binding function by the resin connection portions on the inner peripheral resin layer is different on one end from on the other end in the axial direction, and a force to prevent deformation of the inner peripheral resin layer is relatively small on the other end in the axial direction. Providing the connection holes and the resin connection portions in the axially central portion prevents deformation of the inner peripheral resin layer equally on one end and on the other end in the axial direction.

In contrast, the outer peripheral resin layer may be provided closer to one end in the axial direction of the inner tubular member having an axially straight shape (fifth aspect). Thus, the inner tubular member having the resin layer can be effectively prevented from being inserted in an axially wrong direction or being reversely inserted into a mold of the rubber elastic body.

The sixth aspect relates to the assembly structure of the member mounts. In the assembly structure, layering the inner peripheral resin layer and changing the shape of the inner peripheral resin layer provide the member mounts with the predetermined reference hole and sub-reference hole even with use of the inner tubular members having the same dimensions and shape. The reference hole and the sub-reference hole allow a pair of member mounts to be desirably assembled to the vehicle body while a relative positional relationship of the member mounts is maintained. Furthermore, the inner peripheral resin layer is connected with the outer peripheral resin layer in a plurality of resin connection portions in the connection holes, thus effectively preventing the inner peripheral resin layer from shrinking and deforming and the shape of the inner hole from being changed.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
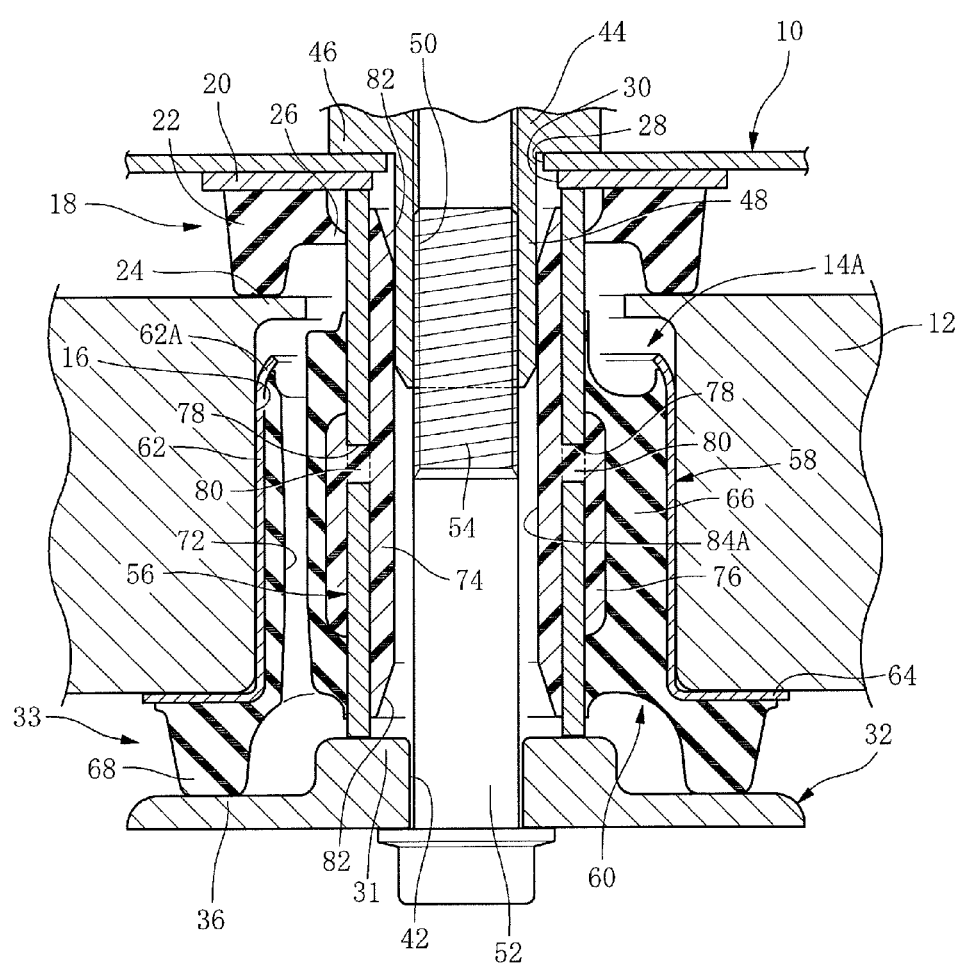
FIG. 1 illustrates a member mount according to an embodiment of the present invention in an assembled state in a vehicle.

The embodiments of the present invention are explained in detail below with reference to the drawings. FIG. 1 includes a panel-shaped vehicle body member 10, a sub-frame 12 (octothorpe (hash-character)-shaped sub-frame) as a suspension member, and a member mount 14A elastically connecting the sub-frame 12 and the and the vehicle body member 10 and isolating vibration therebetween. The sub-frame 12 has a holding hole 16 to which the member mount 14A is press-fitted and held. An upper stopper 18 has a hold fitting 20 and a stopper rubber 22, the hold fitting 20 having a plate shape and an annular shape from a plan view and being placed on the vehicle body member 10 in an assembled state, the stopper rubber 22 being integrally vulcanized and attached to the hold fitting 20 and extending downward. The stopper rubber 22 has an annular shape (from a plan view) and is in contact with a stopper contact 24 of the sub-frame 12 to serve as a stopper. A fitting portion 26 is provided in the stopper rubber 22, the fitting portion 26 having an annular shape from a plan view and a tongue shape from a cross- sectional view and radially extending inward. An inner end portion of the fitting portion 26 is elastically fitted to an outer peripheral surface of the inner tubular member 56 hereinafter described. The vehicle body member 10 and the hold fitting 20 are provided with openings 28 and 30, respectively.

A metal stopper plate 32, which is a main portion of a lower stopper 33, includes an annular holding portion 31 and an annular stopper contact 36. The holding portion 31 is provided in a central portion and axially holds the inner tubular member 56 of the member mount 14A in between with the hold fitting 20 of the upper stopper 18. The stopper contact 36 has a step-down shape relative to the holding portion 31 and extends in the radial direction (direction perpendicular to the axis). The stopper plate 32 is provided with an opening 42 in a central portion thereof.

A positioning nut 44 projecting downward from the vehicle body member 10 serves as a positioning member. The positioning nut 44 has a flange 46 and a tubular portion 48 and is fixed to the vehicle body member 10 by welding. The positioning nut 44 has a female thread hole 50 inside the tubular portion 48. A fastening bolt 52 has a male thread portion 54 in a front end of an axial portion.

The member mount 14A is press-fitted into the holding hole 16 of the sub-frame 12 in an outer tubular member 58 hereinafter described. In the held state, the tubular portion 48 of the positioning nut 44 is inserted internally in a downward direction in the drawing through the openings 28 and 30 of the vehicle body member 10 and the hold fitting 20, respectively, relative to the inner tubular member 56 hereinafter described. The fastening bolt 52 is also inserted internally to the inner tubular member 56 through the opening 42 of the stopper plate 32. The male thread portion 54 is screwed into the female thread hole 50 of the positioning nut 44, and thereby the member mount 14A is assembled to the vehicle body member 10 along with the sub-frame 12.

Figure 2A:
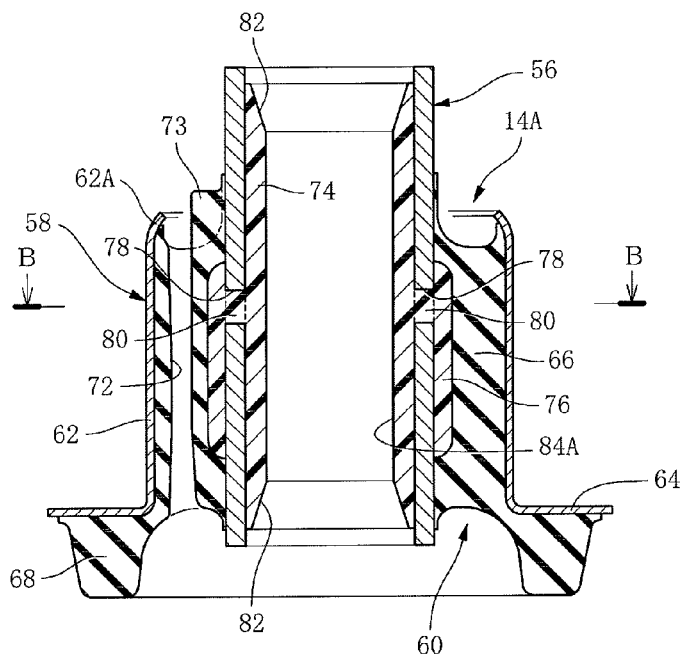
FIG. 2A is a cross-sectional view of the member mount according to the embodiment in an axial direction.
Figure 2B:
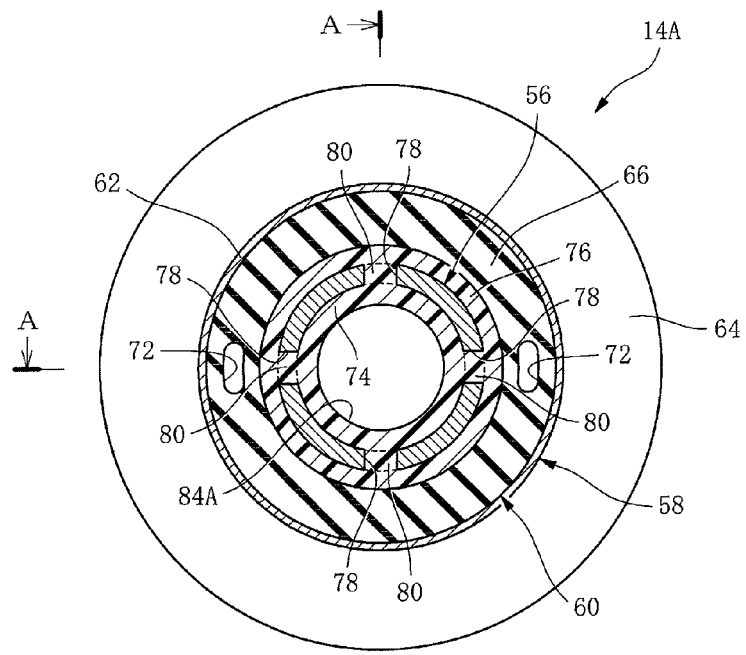
FIG. 2B is a cross-sectional view of the member mount according to the embodiment in a direction perpendicular to the axis.

As shown in FIGS. 2A and 2B, the member mount 14A has the rigid inner tubular member 56 composed of a metal pipe material, the rigid metal outer tubular member 58 surrounding the inner tubular member 56 in a position radially away therefrom, and a rubber elastic body 60 radially connecting the inner tubular member 56 and the outer tubular member 58. The rubber elastic body 60 is integrally vulcanized and attached to the inner tubular member 56 and the outer tubular member 58.

The outer tubular member 58 has a tubular main body 62 and an annular flange 64, the main body 62 extending in a straight shape in a vertical direction of a vehicle or in a vertical direction in FIG. 2A except for a bent portion 62A in an upper end in the drawing, the flange 64 radially projecting outward in a lower end portion of the main body 62. The rubber elastic body 60 has a tubular main body rubber portion 66 and a stopper rubber portion 68, the main body rubber portion 66 being radially interposed between the inner tubular member 56 and the main body 62 of the outer tubular member 58, the stopper rubber portion 68 being connected from the main body rubber portion 66 and extending downward from a lower surface of the flange 64 of the outer tubular member 58. The stopper rubber portion 68 is in contact with the stopper contact 36 of the stopper plate 32 to serve as a stopper. The lower stopper 33 in FIG. 1 includes the stopper rubber portion 68 and the stopper plate 32.

Figure 3:
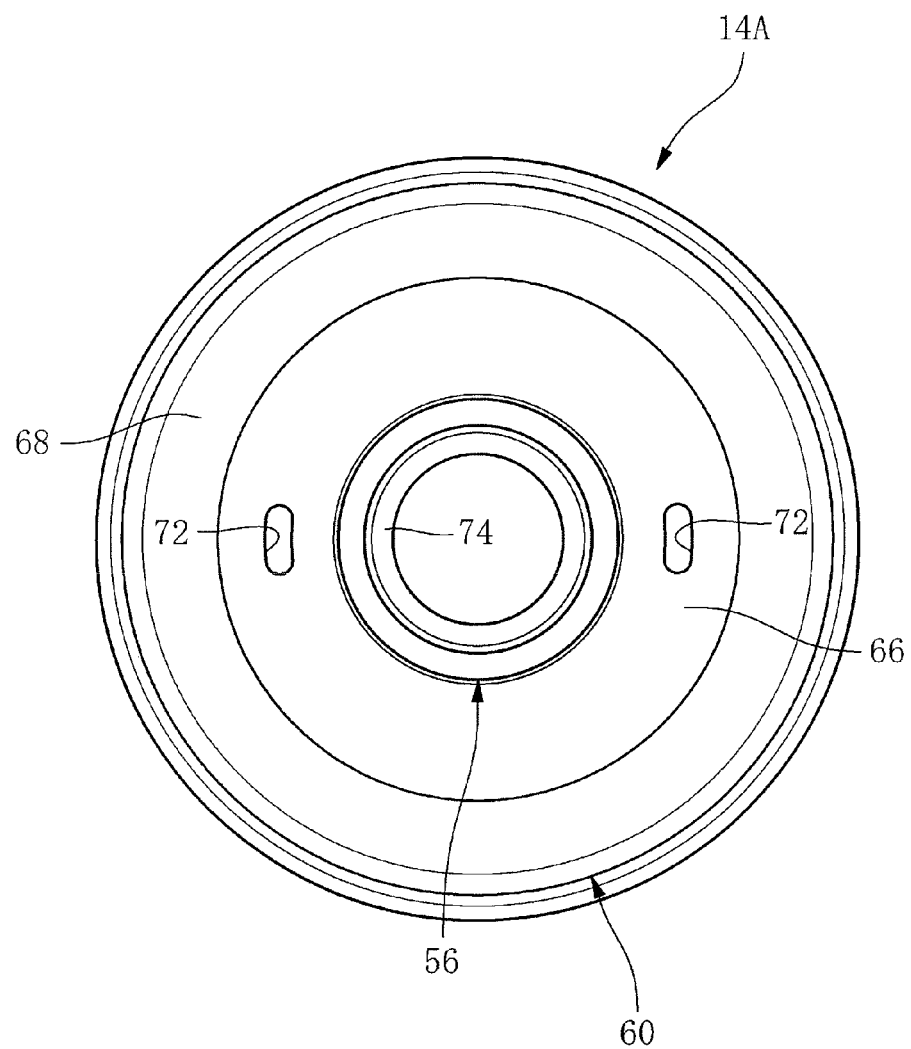
FIG. 3 is a bottom view of the member mount according to the embodiment.

Two hollow portions 72 axially passing through the main body rubber portion 66 are provided in positions 180° away from each other in the circumferential direction, as shown in FIG. 3. Two projections 73 are provided in an end portion axially opposite to the stopper rubber portion 68 of the main body rubber portion 66 in positions 180° different from each other in the same circumferential direction of the hollow portions 72.

Figure 4A:
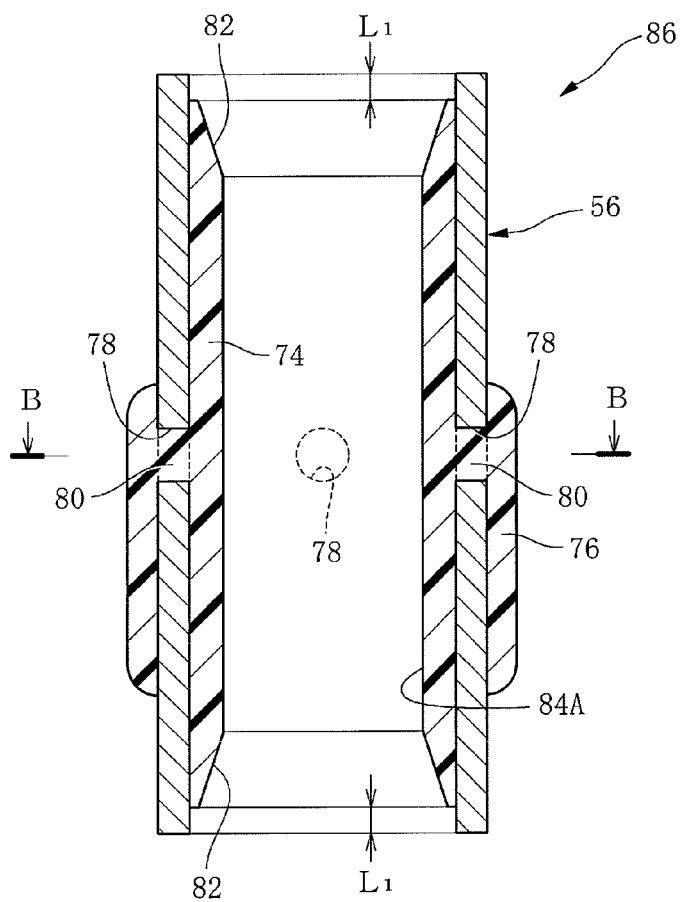
FIGS. 4A and 4B each illustrate an inner tubular member according to the embodiment along with a resin layer.
Figure 4B:
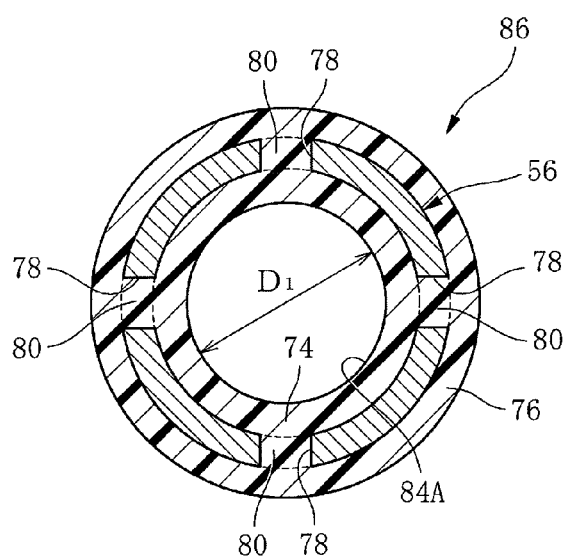

The inner tubular member 56 is provided by cutting a metal pipe material in a predetermined size. The inner peripheral surface and the outer peripheral surface each have a circular cross section and a straight shape in the axial direction, as shown in FIGS. 4A and 4B in detail. An inner peripheral resin layer 74 is layered along the entire periphery on the inner peripheral surface of the inner tubular member 56. An outer peripheral resin layer 76 is layered along the entire periphery on the outer peripheral surface.

The inner peripheral resin layer 74 and the outer peripheral resin layer 76 are connected inside and outside at resin connection portions 80 in connection holes 78 passing through the inner tubular member 56 every 90° in the circumferential direction at equal distances. The inner peripheral resin layer 74 and the outer peripheral resin layer 76 are not adhered to the metal inner tubular member 56 and are held to the inner tubular member 56 through the connection by the resin connection portions 80.

In the present embodiment, the inner peripheral resin layer 74, the outer peripheral resin layer 76, and the resin connection portions 80 are composed of the same material. The resin herein is a polyamide 66 resin containing glass fibers as a reinforcement material. The content of glass fibers is 30 mass % of the resin material as a reference. Another resin may be used instead. The connection holes 78 and the resin connection portions 80 are each provided in an axial central portion of the inner tubular member 56. The connection holes 78 each have a hole diameter of $\phi$ 6 mm.

The outer peripheral resin layer 76 projects partially in the axial direction and radially outward from the outer peripheral surface of the inner tubular member 56 in a constant thickness along the entire periphery. The outer peripheral resin layer 76 is provided in order to increase the spring hardness in the direction perpendicular to the axis of the main body rubber portion 66. The entirety of the outer peripheral resin layer 76 is positioned between an upper end and a lower end in FIG. 2 in the axial direction of the main body rubber portion 66. Accordingly, the outer peripheral resin layer 76 extends axially downward from a position slightly above the connection hole 78 in FIG. 4A and is provided closer to one end in the axial direction of the inner tubular member 56.

The inner peripheral resin layer 74 is provided substantially on the entire length of the inner tubular member 56. Specifically, the inner peripheral resin layer 74 is provided along the entire length of the inner tubular member 56, except for a dimension $L_1$ of each end portion in the axial direction of the inner tubular member 56. The inner peripheral surface of the inner peripheral resin layer 74 is a tapered surface 82 in each of the axial end portions. Other than the portions, the inner peripheral resin layer 74 has an axially straight shape.

In the present embodiment, the inner peripheral resin layer 74 has a constant thickness along the entire periphery and an overall tubular shape. An inner hole 84A provided thereinside is a circular hole having a diameter fitted to the tubular portion 48 of the positioning nut 44 in FIG. 1 on the entire periphery. The inner hole 84A herein has a diameter of $\phi$ 22.5 mm. The inner hole 84A of the inner peripheral resin layer 74 serves as a reference hole to provide a reference position for assembling the member mount to the vehicle body member 10.

The inner peripheral resin layer 74, the outer peripheral resin layer 76, and the resin connection portions 80 are provided by molding a resin material, such as in injection molding, in a state where the inner tubular member 56 is set in a resin mold. In the molding process, the inner peripheral resin layer 74 shrinks due to cooling after the molding and peels off from the inner peripheral surface of the inner tubular member 56 due to the shrinkage, thus likely to deforming in the reduced-diameter direction.

Figure 9A:
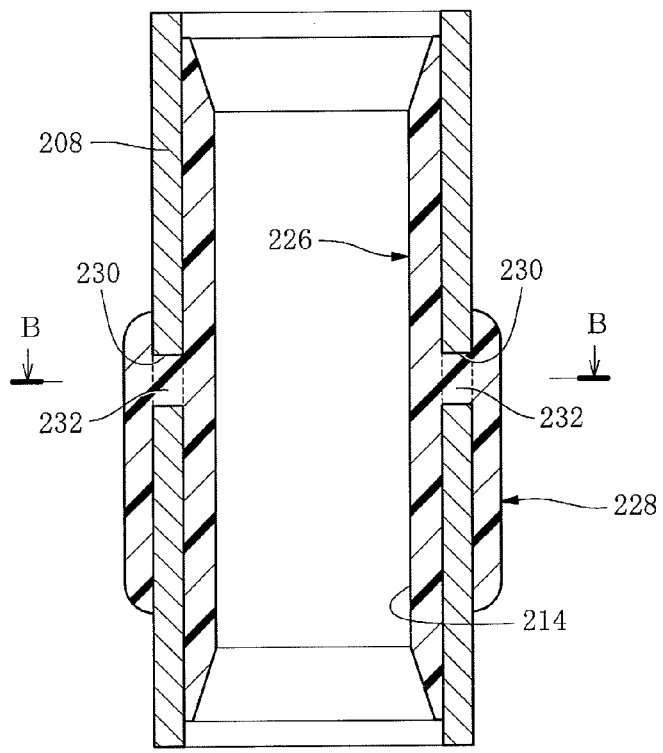
FIGS. 9A and 9B are each a comparative example for background explanation of the present invention.
Figure 9B:
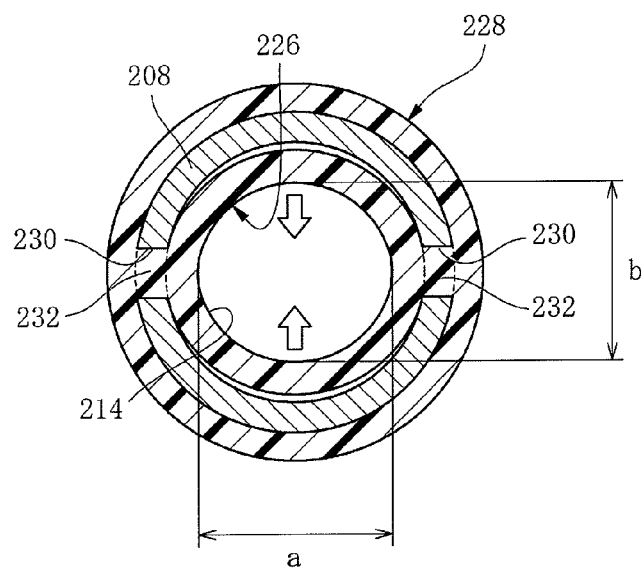

In the present embodiment, however, the resin connection portions 80 are provided in four positions every 90° in the circumferential direction at equal distances. The resin connection portions 80 connect the inner peripheral resin layer 74 and the outer peripheral resin layer 76. Strong binding in the connection portions effectively prevents deformation of the inner peripheral resin layer 74 in the reduced-diameter direction. In the present embodiment, for example, the inner hole 84A of the inner peripheral resin layer 74 after cooling has a difference of approximately 0.2 mm between the maximum diameter and the minimum diameter, thus excellently maintaining a substantially true circle shape. A comparative example shown in FIGS. 9A and 9B has a large difference of approximately 0.7 mm between the maximum diameter and the minimum diameter.

To provide the member mount 14A of FIG. 2, a resin composite article 86 is produced having the inner tubular member 56, the inner peripheral resin layer 74, the outer peripheral resin layer 76, and the resin connection portions 80; the resin composite article 86 is then inserted and set in the axial direction in a mold for molding rubber along with the outer tubular member 58; and, in this state, the rubber elastic body 60 is vulcanized. In the molded state, the lower end in FIG. 1 of the inner tubular member 56 slightly projects downward from the outer tubular member 58 and is positioned in the interior space of the annular stopper rubber portion 68 in the lower stopper 33; and the upper end largely projects upward in the drawing from the outer tubular member 58. In the assembled state to the vehicle, the fitting portion 26 of the upper stopper 18 in FIG. 1 is externally fitted to the upward projection of the inner tubular member 56.

The four connection holes 78 in the inner tubular member 56 in FIGS. 4A and 4B are provided as below. Specifically, as shown in 5A, a hollow tubular dice 92 is inserted inside the inner tubular member 56, the hollow tubular dice 92 having a pair of dice holes 90 oppositely provided in positions 180° away from each other in the circumferential direction. In this state, the inner tubular member 56 is punched out by a pair of punches 94 to provide a pair of connection holes 78 in positions 180° away from each other in the circumferential direction.

Figure 5A:
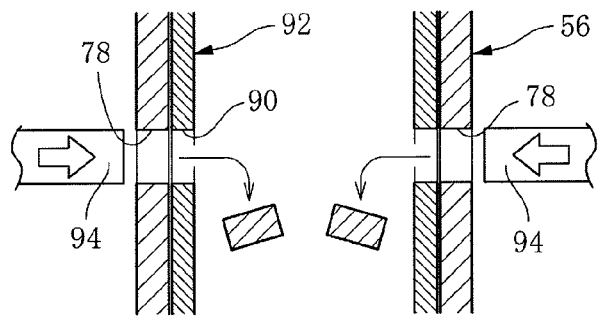
FIGS. 5A to 5C illustrate a method of processing a connection hole in the inner tubular member of FIGS. 4A and 4B.
Figure 5B:
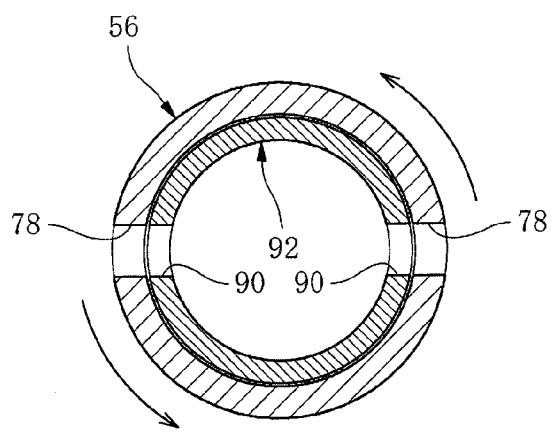
Figure 5C:
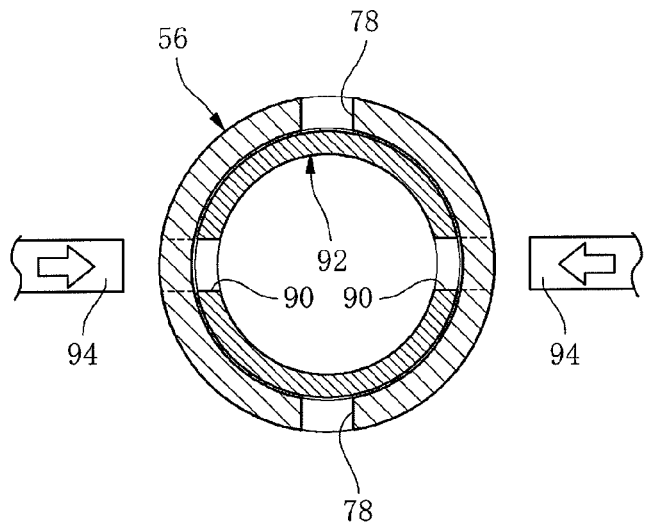

Subsequently, as shown in FIG. 5B, the inner tubular member 56 is rotated by 90° and positioned thereto using the connection holes 78 provided in the process in FIG. 5A. In this state, as shown in FIG. 5C, a pair of the punches 94 and the dice 92 are used again to punch a pair of connection holes 78 opposed to each other. Thus, the four connection holes 78 are easily provided distant every 90° in the circumferential direction.

In a case where the connection holes 78 are provided in an odd number, it is difficult to provide the connection holes 78 in the process above, thus leading to an increase in the process cost. Providing the connection holes 78 in an even number of four allows easy processing at low cost.

Figure 6A:
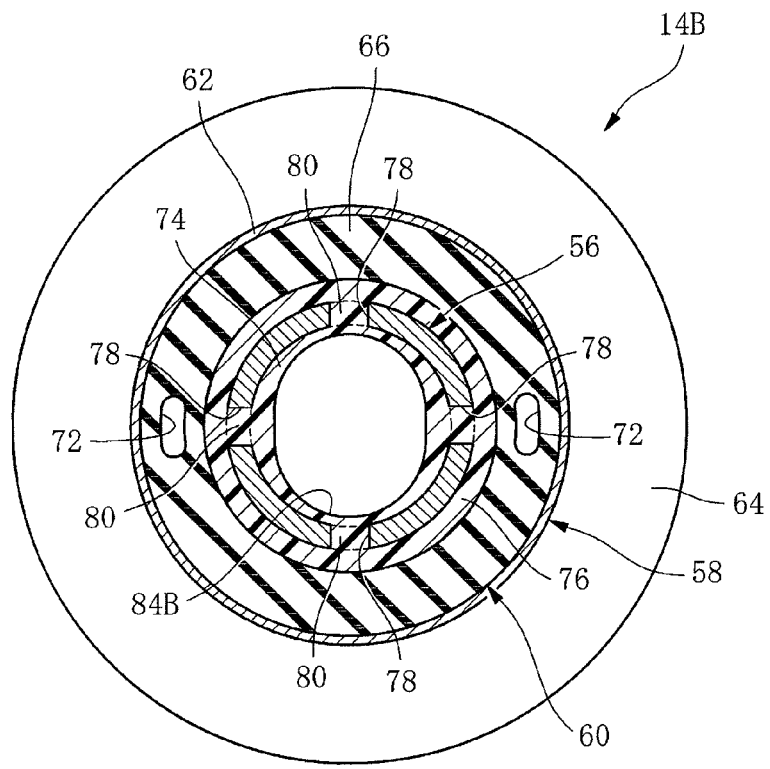
FIGS. 6A and 6B each illustrate a member mount according to an alternative embodiment of the present invention.
Figure 6B:
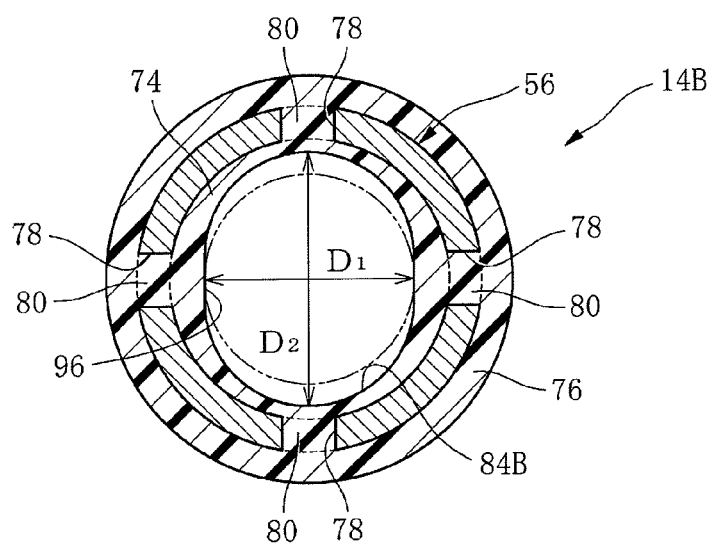
Figure 7:
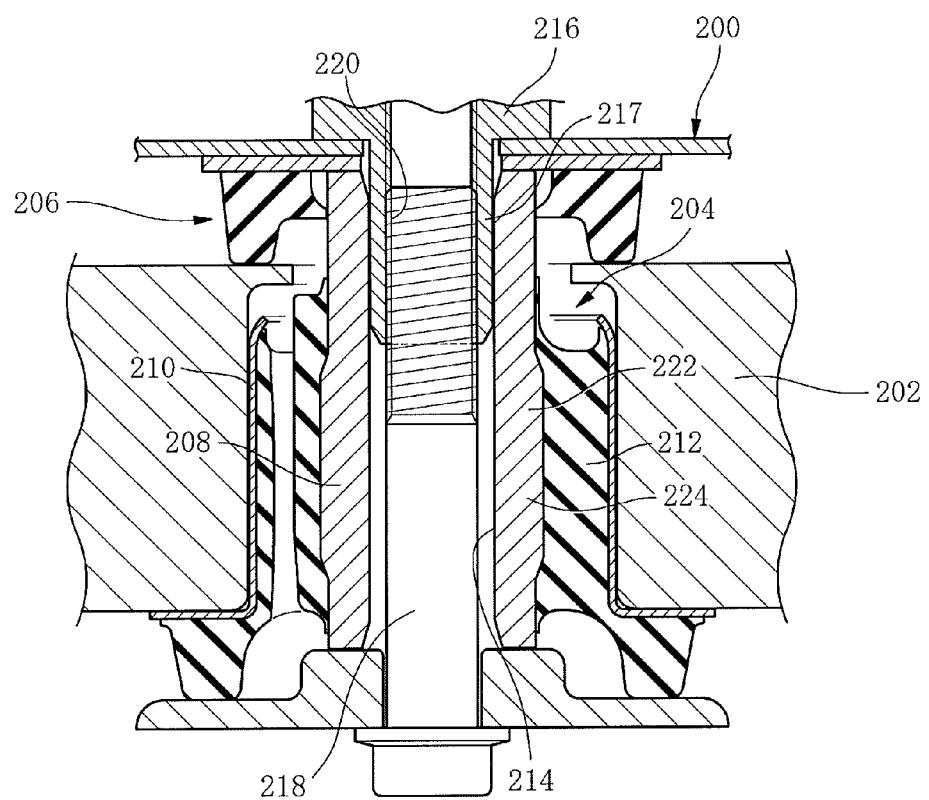
FIG. 7 illustrates a conventional member mount in an assembled state in a vehicle.

FIGS. 6A and 6B illustrate a member mount 14B which is different from the member mount 14A above. The member mount 14B shown in FIGS. 6A and 6B is same as the member mount 14A in that the same inner tubular member 56 as that of the member mount 14A as shown in FIGS. 1 to 4B is used; that the inner tubular member 56 has the inner peripheral resin layer 74 layered on its inner peripheral surface and the outer peripheral resin layer 76 layered on its outer peripheral surface; and that the inner peripheral resin layer 74 and the outer peripheral resin layer 76 are connected through the four resin connection portions 80 in the connection holes 78 provided in different positions every 90° in the circumferential direction. In addition, other configurations of the member mount 14B are same as those of the member mount 14A shown in FIGS. 1 to 4B.

In the member mount 14B in this example, however, the thickness of the inner peripheral resin layer 74 is uneven in the circumferential direction and the shape of an inner hole 84B provided thereinside is different from that of the inner hole 84A of the member mount 14A. Specifically, the inner hole 84B has an elongated shape having a short diameter $D_1$ same as the diameter $D_1$ of the inner hole 84A of the member mount 14A in FIGS. 1 to 4B (refer to FIGS. 4A and 4B) and a long diameter $D_2$ greater than the short diameter $D_1$, specifically greater than the outer diameter of the tubular portion 48 of the positioning nut 44.

Thus, when the tubular portion 48 of the positioning nut 44 in FIG. 1 is inserted into the inner hole 84B of the member mount 14B shown in FIGS. 6A and 6B, the inner hole 84B is properly fitted to the tubular portion 48 in the short diameter, but has a looseness relative to the tubular portion 48 in the long diameter direction. Specifically, the inner hole 84B serves as a sub-reference hole for positioning during assembly of the member mount to the vehicle body member 10.

In this embodiment, the direction connecting a pair of the resin connection portions 80 opposite to each other vertically in FIG. 6B is the long diameter direction of the inner hole 84B and the direction horizontally connecting a pair of the remaining resin connection portions 80 is the short diameter direction of the inner hole 84B. A portion inside a horizontal pair of the resin connection portions 80 in the short diameter direction of the inner hole 84B forms a straight portion 96 having a partially straight shape in the parallel direction to the vertical direction in FIG. 6B, which is the long diameter direction.

In the member mount 14B shown in FIGS. 6A and 6B, the long diameter $D_2$ of the inner hole 84B is 25.3 mm. In the member mount 14B shown in FIGS. 6A and 6B, deformation due to shrinkage after forming of the inner peripheral resin layer 74 is also desirably prevented and thus the shape of the inner hole 84B is desirably maintained as being set.

Figure 8:
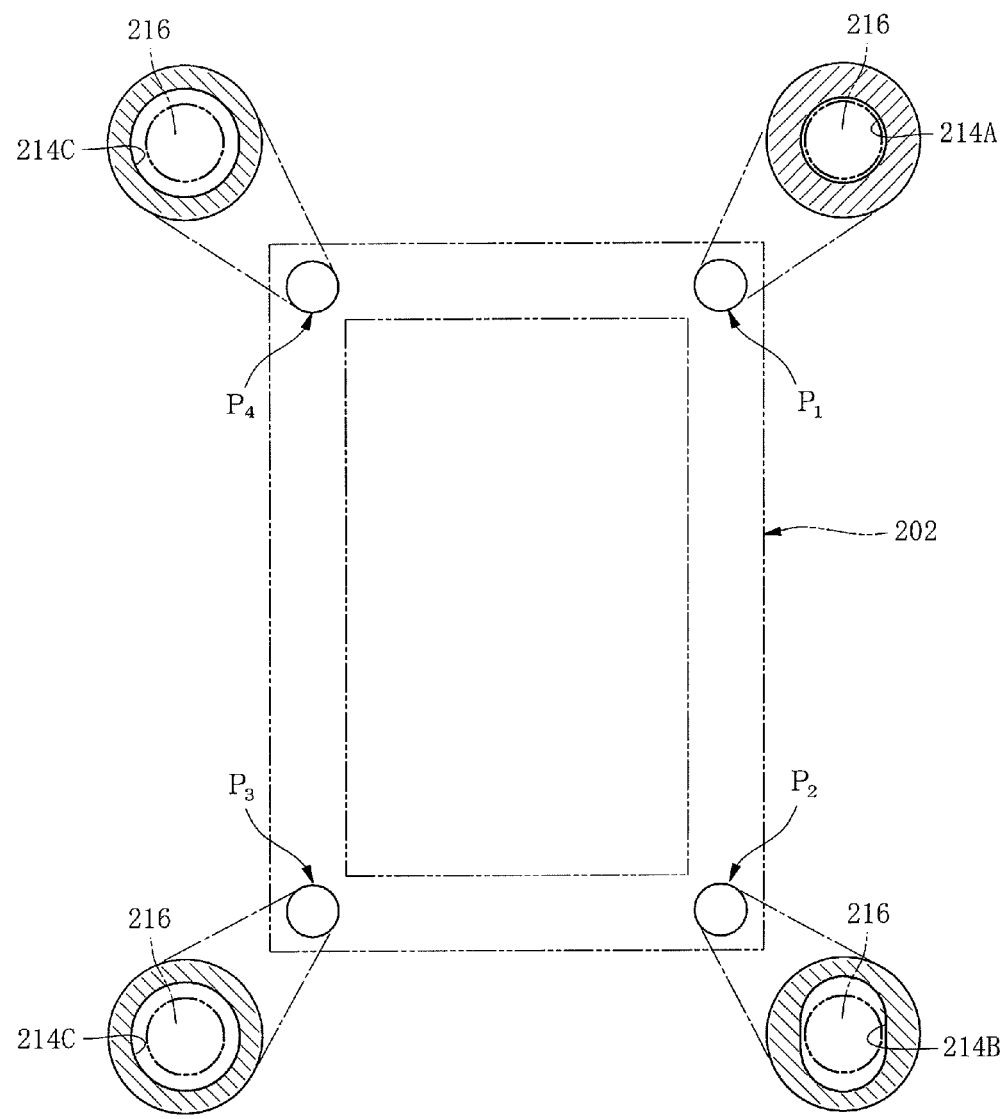
FIG. 8 illustrates a fitting relationship between an inner hole of a member mount and a positioning nut of a vehicle.

In the present embodiment, the member mount 14A shown in FIGS. 1 to 4B can be used as a member mount at the position $P_1$ in FIG. 8 and the member mount 14B shown in FIGS. 6A and 6B can be used as a member mount at the position $P_2$ in FIG. 8. In this case, the inner hole 84A of the member mount 14A at the position $P_1$ as the reference hole determines a reference position for assembly of the sub-frame 202 to the vehicle body member 10, specifically a position for assembly of the sub-frame 202 to the vehicle body member 10 in two orthogonal directions in the direction perpendicular to the axis in the member mount 14A. Furthermore, the inner hole 84B of the member mount 14B at the position P₂ determines a position in one direction perpendicular to the axis, specifically the horizontal direction in FIG. 8, by fitting the short diameter of the inner hole 84B and the tubular portion 48 of the positioning nut 44. For the vertical direction in FIG. 8 orthogonal to the horizontal direction, a positional error can be absorbed by a looseness provided between the long diameter and the tubular portion 48 of the positioning nut 44.

According to the present embodiment described above, the inner peripheral resin layer 74 layered on the inner peripheral surface desirably positions the positioning nut 44 projecting from the vehicle body member 10 while a metal pipe material is used which is thinner and less expensive than a conventional forged article. Merely changing the shape of the inner peripheral resin layer 74 changes the shape of the inner hole 84 into which the positioning member 44 is inserted even with use of the same metal pipe material for the inner tubular member 56, thus further reducing the cost of the inner tubular member 56.

In the present embodiment, the inner peripheral resin layer 74 and the outer peripheral resin layer 76 are connected to each other in the resin connection portions 80 of the connection holes 78 in the inner tubular member 56 at a plurality of positions of four or more in the circumferential direction at equal distances. Thus, the peripheral length can be shortened from one resin connection portion 80 to the circumferentially adjacent resin connection portion 80 in the inner peripheral resin layer 74, and all peripheral lengths between the adjacent resin connection portions 80 can be equal. Accordingly, deformation can be effectively prevented from occurring in association with peeling off from the inner peripheral surface of the inner tubular member 56 due to shrinkage caused by cooling after molding of the inner peripheral resin layer 74, and the shape of the inner hole 84 can be prevented from deforming due to the deformation of the inner peripheral resin layer 74.

In the present embodiment, disposing the connection holes 78 and the resin connection portions 80 in the axially central portion of the inner tubular member 56 having an axially straight shape provides the advantages below. With the connection holes 78 and the resin connection portions 80 disposed closer to one end from the axially central portion, the binding function by the resin connection portions 80 on the inner peripheral resin layer 74 is different on one end from on the other end in the axial direction, and a force to prevent the inner peripheral resin layer 74 from deforming is relatively small on the other end in the axial direction. Providing the connection holes 78 and the resin connection portions 80 in the axially central portion prevents deformation of the inner peripheral resin layer 74 equally on one end and on the other end in the axial direction.

In contrast, the outer peripheral resin layer 76 is provided closer to one end in the axial direction of the inner tubular member 56 having an axially straight shape. Thus, the inner tubular member 56 having the resin layer can be effectively prevented from being inserted in an axially wrong direction or being reversely inserted into a mold of the rubber elastic body 60.

According to the assembly structure of the present embodiment, layering the inner peripheral resin layer 74 and changing the shape of the inner peripheral resin layer 74 provide the member mounts with the predetermined reference hole and sub-reference hole even with use of the inner tubular members 56 having the same dimensions and shape. The reference hole and sub-reference hole allow desirable assembly of a pair of the member mounts 14A and 14B, specifically assembly of the sub-frame 12, to the vehicle body member 10 while a relative positional relationship of the member mounts are maintained.

The embodiment of the present invention is explained in detail above as merely an example. In the embodiment above, for example, the four connection holes and resin connection portions are provided at equal distances in the circumferential direction in the inner tubular member. The connection holes and resin connection portions may be provided, however, in any even number of four or more, such as six or eight. Furthermore, a case is described in the embodiment where a sub-frame as a suspension member is mounted on a vehicle body through the member mount. The present invention may be applied in a case where a suspension member other than a sub-frame is assembled to a vehicle body through the member mount. The present invention may be configured in a variety of modified ways within deviating from its concept.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A member mount elastically connecting a vehicle body and a suspension member and isolating vibration, the member mount comprising:
   a rigid inner tubular member, the rigid inner tubular member being fixed to a vehicle body in a positioned condition by inserting therein a positioning member projecting from the vehicle body;
   a rigid outer tubular member surrounding the rigid inner tubular member in a position radially spaced therefrom, the rigid outer tubular member being fixed to a suspension member; and
   a rubber elastic body radially connecting the rigid inner tubular member and the rigid outer tubular member,
   wherein
   a tubular inner peripheral resin layer is provided on an inner peripheral surface of the rigid inner tubular member, the tubular inner peripheral resin layer allowing the positioning member to be inserted into an inner hole provided therein for positioning the rigid inner tubular member,
   a tubular outer peripheral resin layer is provided on an outer peripheral surface of the rigid inner tubular member, the tubular outer peripheral resin layer projecting radially outward from the outer peripheral surface and increasing spring hardness in a direction perpendicular to an axis of the rubber elastic body, the tubular inner peripheral resin layer and the tubular outer peripheral resin layer are connected to each other by resin connection portions extending though connection holes passing through the rigid inner tubular member in at least four positions circumferentially spaced at equal distances along the rigid inner tubular member, wherein the positioning member has a circular outer peripheral shape and the tubular inner peripheral resin layer has a circular inner hole having a hole diameter that corresponds to an outer diameter of the positioning member and fitted to the positioning member along an entire periphery, and wherein the connection holes and resin connection portions are each provided in an axially central portion of the rigid inner tubular member having an axially straight shape.

2. The member mount according to claim 1, wherein the tubular outer peripheral resin layer is provided closer to one end in the axial direction of the rigid inner tubular member having an axially straight shape.

3. A member mount elastically connecting a vehicle body and a suspension member and isolating vibration, the member mount comprising:

a rigid inner tubular member, the rigid inner tubular member being fixed to a vehicle body in a positioned condition by inserting therein a positioning member projecting from the vehicle body;

a rigid outer tubular member surrounding the rigid inner tubular member in a position radially spaced therefrom, the rigid outer tubular member being fixed to a suspension member; and a rubber elastic body radially connecting the rigid inner tubular member and the rigid outer tubular member, wherein a tubular inner peripheral resin layer is provided on an inner peripheral surface of the rigid inner tubular member, the tubular inner peripheral resin layer allowing the positioning member to be inserted into an inner hole provided therein for positioning the rigid inner tubular member, a tubular outer peripheral resin layer is provided on an outer peripheral surface of the rigid inner tubular member, the tubular outer peripheral resin layer projecting radially outward from the outer peripheral surface and increasing spring hardness in a direction perpendicular to an axis of the rubber elastic body, the tubular inner peripheral resin layer and the tubular outer peripheral resin layer are connected to each other by resin connection portions extending though connection holes passing through the rigid inner tubular member in at least four positions circumferentially spaced at equal distances along the rigid inner tubular member, wherein the positioning member has a circular outer peripheral shape and the tubular inner peripheral resin layer has an elongated inner hole having a short diameter that corresponds to an outer diameter of the positioning member and a long diameter greater than the outer diameter of the positioning member, and wherein the connection holes and resin connection portions are each provided in an axially central portion of the rigid inner tubular member having an axially straight shape.

4. The member mount according to claim 3, wherein the tubular outer peripheral resin layer is provided closer to one end in the axial direction of the rigid inner tubular member having an axially straight shape.

5. An assembly structure of member mounts to a vehicle body in two different positions in a condition maintaining a relative positional relationship to each other, each of the member mounts elastically connecting the vehicle body and a suspension member and isolating vibration, each of the member mounts comprising a rigid inner tubular member, a rigid outer tubular member surrounding the rigid inner tubular member in a position radially spaced therefrom, and a rubber elastic body radially connecting the rigid inner tubular member and the rigid outer tubular member, the rigid outer tubular member being fixed to a suspension member, the rigid inner tubular member being fixed to the vehicle body in a positioned condition by inserting therein a positioning member projecting from the vehicle body, the structure comprising:

an inner hole inside the rigid inner tubular member of a first member mount provided as a circular reference hole having a hole diameter that corresponds to an outer diameter of a positioning member so as to be fitted thereto along an entire periphery, the positioning member having a circular outer peripheral shape and projecting from the vehicle body, the reference hole being fitted to a positioning member along the entire periphery so as to position the first member mount in two orthogonal directions in a direction perpendicular to an axis; and an inner hole inside the rigid inner tubular member of a second member mount provided as an elongated sub-reference hole having a short diameter that corresponds to an outer diameter of a positioning member and a long diameter greater than the outer diameter of the positioning member, the sub-reference hole being fitted to a positioning member in the short diameter direction so as to position the second member mount in one direction perpendicular to the axis and in an direction orthogonal to an alignment direction of the first member mount, the sub-reference hole absorbing in the long diameter direction a positional error relative to the positioning member, wherein in each of the member mounts, a tubular inner peripheral resin layer is provided on an inner peripheral surface of the rigid inner tubular member, the tubular inner peripheral resin layer allowing the positioning member to be inserted into the inner hole provided therein for positioning the rigid inner tubular member; a tubular outer peripheral resin layer is provided on an outer peripheral surface of the rigid inner tubular member, the tubular outer peripheral resin layer projecting radially outward from the outer peripheral surface and increasing spring hardness in the direction perpendicular to the axis of the rubber elastic body; and the tubular inner peripheral resin layer and the tubular outer peripheral resin layer are connected to each other by resin connection portions extending through connection holes passing through the rigid inner tubular member in at least four positions circumferentially spaced at equal distances along the rigid inner tubular member;

in the first member mount, the rigid inner tubular member has a tubular shape having an inner diameter greater than the outer diameter of the positioning member, and the tubular inner peripheral resin layer is provided on the inner peripheral surface of the rigid inner tubular member, the tubular inner peripheral resin layer having a circular inner hole that has a hole diameter corresponding to the outer diameter of the positioning member and that is fitted to the positioning member along the entire periphery, the inner hole being provided as the reference hole, and in the second member mount, the rigid inner tubular member has a tubular shape having the same dimensions as the rigid inner tubular member of the first member mount, and the tubular inner peripheral resin layer is provided on the inner peripheral surface of the rigid inner tubular member, the tubular inner peripheral resin layer having an elongated inner hole having a short diameter that corresponds to an outer diameter of the positioning member and a long diameter greater than the outer diameter of the positioning member, the inner hole being provided as the sub-reference hole.

\* \* \* \* \*